United States Patent [19]

Tomforde

[11] 4,368,505

[45] Jan. 11, 1983

[54] AUTOMOTIVE VEHICLE HEADLIGHT LENS CLEANING DEVICE

[75] Inventor: Johann Tomforde, Sindelfingen, Fed. Rep. of Germany

[73] Assignee: Daimler-Benz Aktiengesellschaft, Stuttgart, Fed. Rep. of Germany

[21] Appl. No.: 164,815

[22] Filed: Jun. 30, 1980

[30] Foreign Application Priority Data

Jun. 29, 1979 [DE] Fed. Rep. of Germany ....... 2926305

[51] Int. Cl.³ .............................................. B60Q 1/00
[52] U.S. Cl. ........................................ 362/80; 362/83; 362/96; 362/234; 362/249; 362/252; 362/253; 362/364; 362/365; 362/367
[58] Field of Search ...................... 362/80, 83, 96, 234, 362/249, 252, 253, 364, 365, 367

[56] References Cited

U.S. PATENT DOCUMENTS 3,593,015 7/1971 Marchant .............................. 362/96
3,609,450 9/1971 Hart ...................................... 362/96

*Primary Examiner*—Stephen J. Lechert, Jr.
*Attorney, Agent, or Firm*—Paul M. Craig, Jr.

[57] ABSTRACT

A device for cleaning a lamp arrangement of a motor vehicle such as, for example, a divided headlight arrangement which is disposed so as to be set back with respect to a forward panel frame member of the motor vehicle. A separating web of the panel frame is located between two juxtaposed lamps of the divided headlamp arrangement with at least one nozzle being disposed in two lateral surfaces of the separating web. The nozzle is oriented toward the respective lens of the headlamps and emits a jet of cleaning fluid on the respective lenses.

7 Claims, 3 Drawing Figures

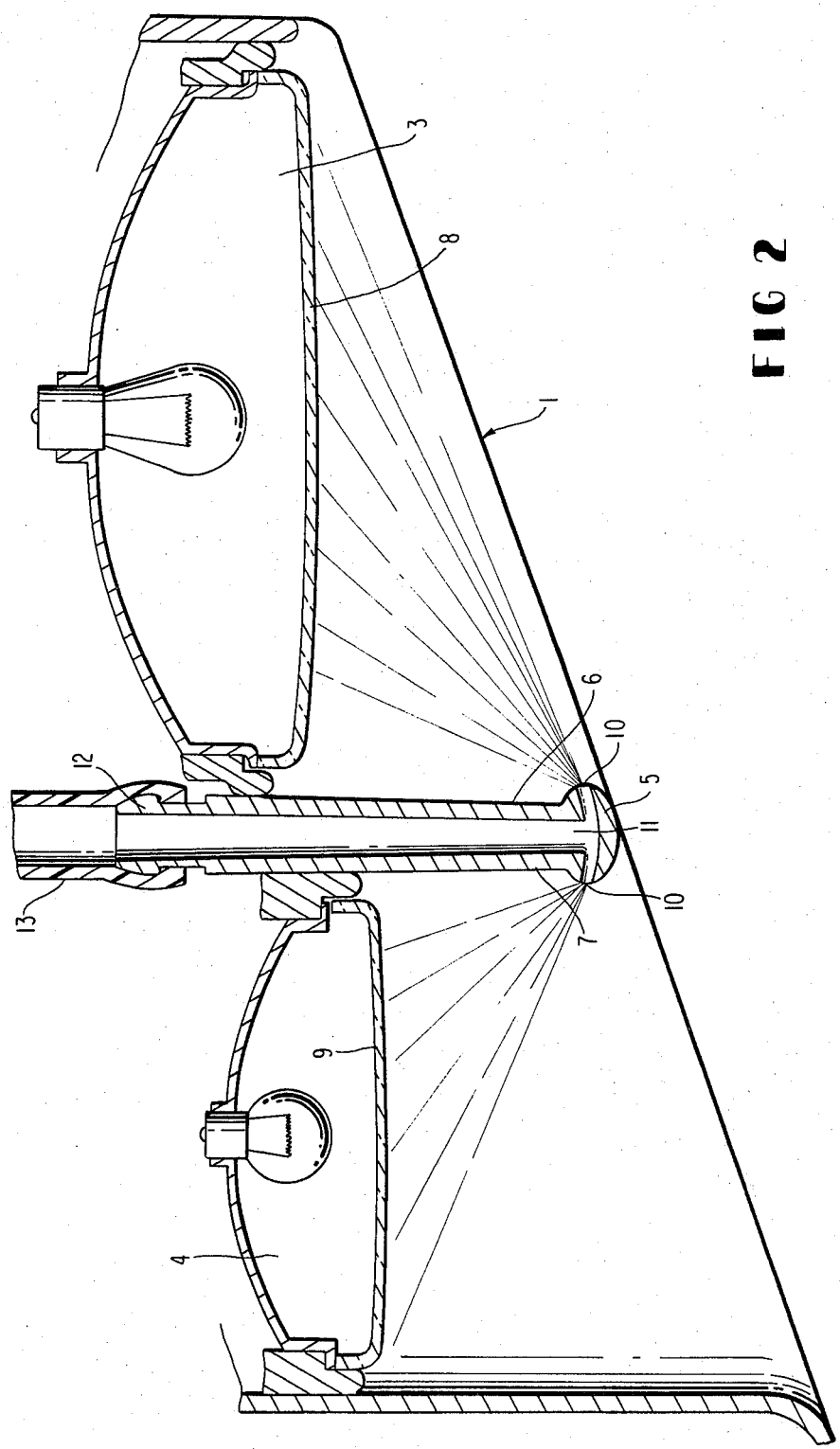

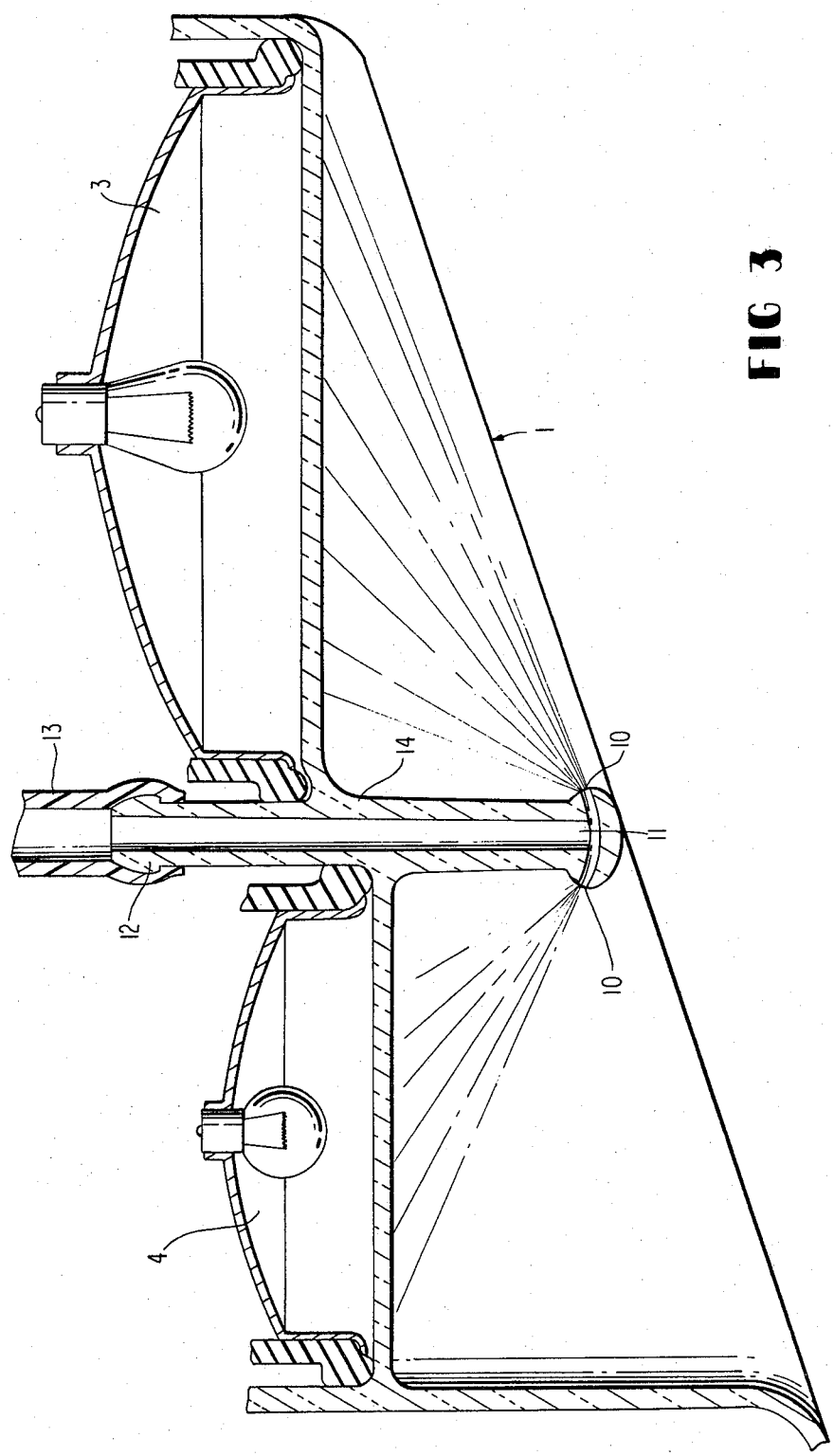

AUTOMOTIVE VEHICLE HEADLIGHT LENS CLEANING DEVICE

The present invention relates to a cleaning installation and, more particularly, to a cleaning device for cleaning headlight lens of an automotive vehicle, which vehicle is provided with headlights which are arranged so as to be set back with respect to a panel frame of a front section of the vehicle, with the cleaning device including a nozzle disposed at a lateral surface of the panel frame of the vehicle, which nozzle is adapted to dispense a cleaning fluid therefrom onto the automobile headlight lens.

Cleaning devices for headlight lenses of automotive vehicles with set back headlights have been proposed wherein, in a lateral surface of the panel frame respectively oriented toward a center of the vehicle, a wiper means such as, for example, a reciprocating wiper blade, sweeps the lens of the headlight with a nozzle being provided through which cleaning fluid is sprayed on the headlight lens. A disadvantage of such proposed cleaning devices resides in the fact that such cleaning devices are rather expensive on the whole. Moreover, the arrangement of the wiper means makes the cleaning device rather damage prone due to the projecting structural contour of the wiper means.

The aim underlying the present invention essentially resides in providing a device for cleaning automobile headlight lenses on headlights which are set back with respect to a front section of the vehicle, which cleaning device sprays a cleaning fluid directly on the headlight lens and/or turning signal lenses.

In accordance with advantageous features of the present invention, with set back headlights, a divided lamp arrangement is provided which includes a separating web of a panel frame located between two juxtaposed headlamps with at least one nozzle being disposed in the two lateral surfaces of the separating web, which nozzle is oriented toward the respective headlamp lens and which is adapted to emit a jet of cleaning fluid.

The divided lamp arrangement of the present invention may be formed by a dual headlight unit used, for example, to provide for high and low beams or also a lamp arrangement which includes main headlights and fog lamps.

It is also possible in accordance with the present invention to provide the cleaning device for a headlight and blinker or turning signal arrangement which is set back with respect to the panel frame of the front section of the vehicle, with the nozzles being located in side walls of a separating web between the headlamp and blinker or turn signal lamp, with the respective nozzles issuing or emitting a jet of cleaning fluid onto the headlamp and lens of the blinker or turning signal lamp.

It is also possible in accordance with the present invention to provide the cleaning device in a dual headlight and blinker lamp arrangement wherein the nozzles are disposed in side walls of two separating webs between the individual lamps with the nozzles being adapted to emit the cleaning fluid onto the respective lamp lenses. An advantage of the utilization of the present invention in this type of lamp combination resides in the fact that the main headlight lens can be cleaned from both sides with washing jets emitted or ejected from the nozzles by virtue of the fact that the main headlight is arranged in the middle of the free lamps.

In accordance with further advantageous features of the present invention, at least one nozzle may be disposed in a side wall located toward a center of the vehicle, which side wall is associated with the inner headlight in closer proximity to the center of the vehicle so that also this headlight can be cleaned from both sides by way of washing jets emitted or ejected from the nozzles.

The advantages of arranging the nozzles in lateral surfaces of the separating web which nozzles are oriented toward the respective lamp lenses reside in the fact that such nozzles are less exposed to the attack of dirt or the like which could lead to a clogging thereof since the nozzles are deep set and shielded from the front. Moreover, with an arrangement of the nozzles of the cleaning device in accordance with the present invention, any interferring parts projecting from the front section of the vehicle are avoided so that this nozzle arrangement also contributes toward a more pleasing appearance as well as a better aerodynamic shape of the front section of the vehicle. Furthermore, by providing a better aerodynamic shape, at higher driving speeds a lower drag is encountered and troublesome wind noises are reduced.

Advantageously, in accordance with the present invention, the nozzles and feed ducts may be integrally molded with the separating web of the panel frame so that an expensive separate installation of the nozzle bodies is not required; however, at the same time, a simple connection for the cleaning fluid supply condiuts is achieved which is protected from the outside and accommodated in the engine space.

It is also possible in accordance with the present invention for the panel frame, lamp lenses covering the lamps, and separating web equipped with the nozzles and fed ducts to be made as an integral part manufactured from a transparent material which is adapted to simply be installed in the front section of the vehicle.

Additionally, in order to prevent a failure due to a freezing of the cleaning fluid, in accordance with further advantageous features of the present invention, heating wires may be disposed in the separating web of the panel frame at least in a zone of the nozzles so that the nozzles may be heated when low temperatures occur.

Accordingly, it is an object of the present invention to provide a cleaning device for automobile headlight lenses which avoids, by simple means, shortcomings and disadvantages encountered in the prior art.

Another object of the present invention resides in providing a cleaning device for lenses of automobile lamps which is simple in construction and therefore relatively inexpensive to manufacture.

Yet another object of the present invention resides in providing a cleaning device for lenses of automobile lamps which is suitable for an economical series production in the vehicle manufacturing industry.

A still further object of the present invention resides in providing a cleaning device for lens of lamps of an automobile which functions realiably under all operating conditions.

A still further object of the present invention resides in providing a cleaning device for lenses of automobile lamps which enables a better aerodynamic shaping of the section of the vehicle at which the lamps are disposed.

These and other objects, features, and advantages of the present invention will become more apparent from the following description when taken in connection with the accompanying drawings which show, for the purposes of illustration only, one embodiment in accordance with the present invention, and wherein:

FIG. 2 is a cross sectional view taken along the line II—II in FIG. 1; and

FIG. 3 is a cross sectional view similar to FIG. 2 illustrating an additional embodiment of a cleaning device in accordance with the present invention.

Figure 1:
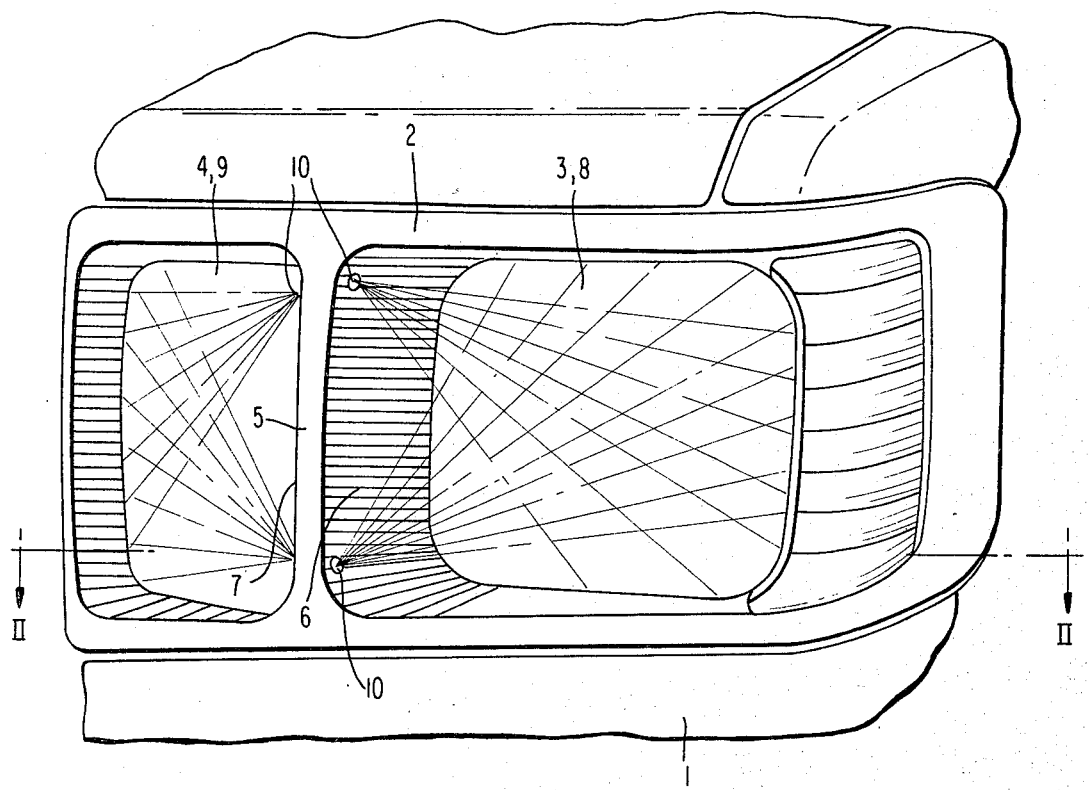
FIG. 1 is a front or elevational view of an automobile having set back dual headlights at which is arranged in a panel frame of a front section of the automobile a cleaning device in accordance with the present invention.

Referring now to the drawings wherein like reference numerals are used throughout the various views to designate like parts and, more particularly, to FIG. 1, according to this Figure, an automobile is provided with an obliquely extending front section generally designated by the reference numeral 1, with dual headlights 3, 4 being arranged so as to be offset rearwardly or backward with respect to a panel frame member 2. The panel frame member 2 is provided with a separating web 5 in a zone of neighboring outer contours of the two headlights 3, 4. The separating web 5 is equipped in a forward upper and lower area with two lateral surfaces 6, 7 in which is respectively disposed a nozzle 10 oriented toward the lens 8, 9 of the headlights 3, 4. The nozzles 10 are adapted to emit a jet of cleaning fluid on the respective headlight lenses 8, 9.

As shown most clearly in FIG. 2, a single feed duct 11 is integrally formed with the separating web 5. The single feed duct 11 is respectively associated with the upper and lower nozzles 10. The feed duct 11 supplies the cleaning fluid to the nozzles 10.

In order to facilitate the manufacturing of the cleaning device of the present invention, advantageously panel frame member 2 consists of a suitable weather and temperature-resistant and light-weight synthetic resinous material such as, for example, an injection molded component of polycarbonate, with the nozzles 10 and feed duct 11 being incorporated into the separating web 5 of the panel frame 2 during the molding operation of the panel frame. The feed duct 11 is provided with connecting nipples 12 for enabling a flexible hose 13 to be connected thereto. The other end of the flexible hose 13 is connected to a cleaning fluid conveying unit (not shown), of conventional construction, which may be accommodated in the engine space of the automobile. The cleaning fluid conveying unit may, for example, consist of a storage tank accommodating the cleaning fluid with a valve and a pump being provided for controlling the conveying of the cleaning fluid. Upon activation of the cleaning fluid conveying unit by, for example, switching on the pump and opening the valve, cleaning fluid passes under pressure through the flexible hose 13 and feed ducts 11 to the nozzles 10 and is then sprayed onto the headlight lenses 8, 9 so as to effect a cleaning thereof.

As can readily be appreciated, the other side of the automobile is provided with dual headlights and a panel frame member 2 which also includes a separating web in which is disposed a fed duct for feeding cleaning fluid to two nozzles which are adapted to the emit or eject a cleaning fluid onto the lenses of the headlights.

As shown in FIG. 3, the obliquely extending front section 1 of the automobile is provided with dual headlights 3, 4 set back with respect to the panel frame in the same manner as the construction of FIG. 1; however, in this construction, diffusors of the headlights 3, 4 and the separating web provided with nozzles 10 and feed duct 11 are fashioned as a one-piece cover part 14 made of a transparent material, which cover part 14 is adapted to be installed in the front section 1 of the automobile.

It is also possible in accordance with the present invention, with an obliquely extending front section and dual headlight arrangement set back with respect thereto, similar to the construction of FIG. 3, for the panel frame to be fashioned as a one piece, staggered, transparent cover part provided with two diffusor sections covering the lamps 3, 4 and with two lateral surfaces disposed toward the center of the vehicle, with at least one nozzle being oriented to the respective diffusor section which nozzle is integrally molded in each lateral surface.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A device for cleaning a lamp arrangement of a motor vehicle, the lamp arrangement including at least two juxtaposed lamps and lens means associated with the respective lamps for covering the same, characterized in that a separating web means is disposed between the two juxtaposed lamps, the separating web means includes two lateral surfaces respectively facing a lens means associated with the lamps, at least one nozzle means is provided in each of the lateral surfaces, said nozzle means is oriented toward a respective lens means so as to enable an emitting of a jet of cleaning fluid on an adjacent lens means.

2. A device according to claim 1, characterized in that the two juxtaposed lamps form a dual headlamp arrangement for the motor vehicle, and in that the headlamp arrangement is arranged at a front of the motor vehicle at a set back with respect to a forward panel frame member of the motor vehicle.

3. A device according to one of claims 1 or 2, characterized in that the nozzle means disposed in each of the lateral surfaces are at approximately the same level, and in that at least one common feed duct is provided in the separating web means for supplying cleaning fluid to the respective nozzle means.

4. A device according to claim 3, characterized in that the lens means associated with the respective lamps and the separating web means with the nozzle means are formed as a one piece cover part for both of the lamps.

5. A device according to claim 4, characterized in that heating means are disposed in at least one of the separating web or the cover part at least in an area of the respective nozzle means.

6. A device according to claim 5, characterized in that the heating means are formed as heating wires.

7. A device according to claim 1, characterized in that a separate feed duct is provided in the separating web for supplying cleaning fluid to the respective nozzle means.

* * * * *